Sept. 22, 1964 J. R. DOLLENS 3,149,513
METHOD OF MAKING LAMINATED PIPE
Original Filed Sept. 8, 1958

INVENTOR.
JAMES R. DOLLENS
BY
ATTORNEYS.

3,149,513
METHOD OF MAKING LAMINATED PIPE
James R. Dollens, Valdosta, Ga., assignor to Arvin Industries, Inc., Columbus, Ind., a corporation of Indiana
Original application Sept. 8, 1958, Ser. No. 759,703, now Patent No. 3,009,484, dated Nov. 2, 1961. Divided and this application June 13, 1960, Ser. No. 35,736
4 Claims. (Cl. 80—62)

This invention relates to a method of making laminated pipe, and is principally concerned with the production of laminated metal pipe comprising a plurality of coaxially aligned pipes rigidly joined together over substantially their entire abutting surfaces. This application constitutes a division of my copending application Serial No. 759,703, filed September 8, 1958, and now U.S. Patent No. 3,009,484, issued November 2, 1961.

The principal feature characterizing my invention is the lamination of a plurality of coaxially aligned metal pipes by a step-wise compression of the outer pipe elements to produce a substantially continuous rigid interfitting grip between the adjacent walls of adjacent pipes without the formation of integral weld joint or joints. This step-wise compression of the outer pipe elements produces a laminated construction having excellent strength and sound attenuating properties making it very desirable for use in the exhaust systems of automotive vehicles.

In carrying out my invention in its preferred form, the pipes to be laminated are placed one inside the other in substantially coaxial alignment, and are then passed between a plurality of compression rolls. The rolls are arranged in a sequential order to produce a step-wise compression of the outer pipe elements of increasing magnitude. During such compression, the outer pipe elements are compressed beyond their limits of elasticity, with the resultant compression imparted to the innermost pipe being of an amount insufficient to compress it beyond its limits of elasticity. Conveniently, the axes of the pairs of rolls between which the pipes pass during lamination may be disposed at a plurality of angles to the pipe axis in order to subject the entire circumference of the outermost pipe elements to the maximum compressive force of the several rolls. The laminated pipe thus formed may be bent into any desired contour without producing the characteristic wrinkling and partial collapse inherent in the methods of pipe lamination heretofore employed.

Figure 1:
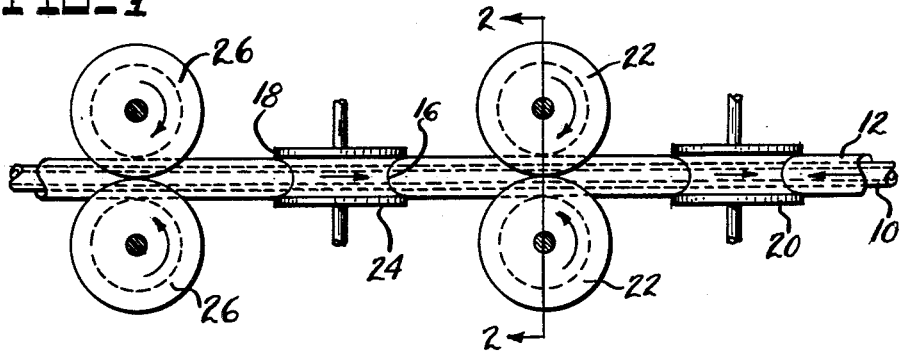
Figure 2:
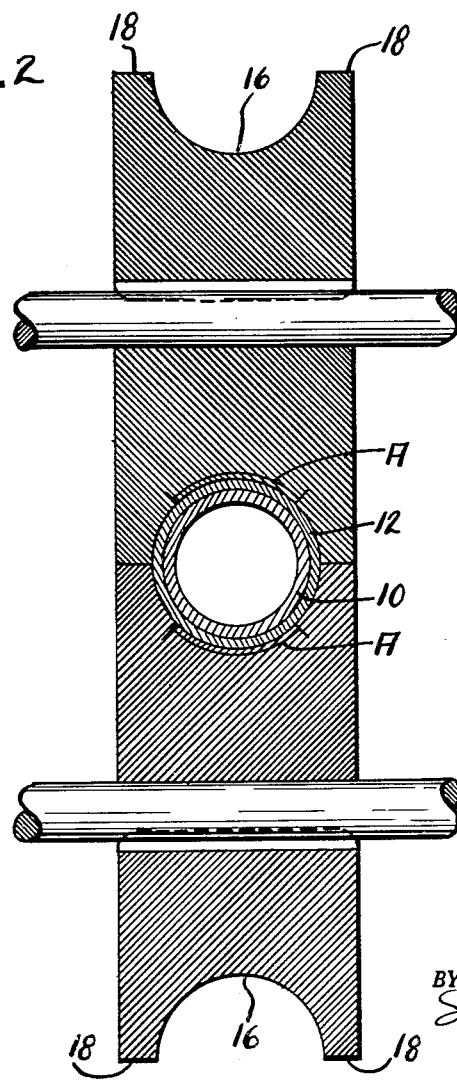

The accompanying drawing illustrates my invention. In such drawing:

FIG. 1 is a diagrammatic view of a method of laminating metal pipe embodying my invention; and FIG. 2 is a sectional view taken on the lines 2—2 of FIG. 1.

My invention is concerned with the production of laminated metal pipe in which a plurality of metal pipes are rigidly joined together in coaxial alignment without the necessity of forming integral weld joints between the adjacent faces of the pipes forming the laminate. Any number of metal pipes may be laminated in coaxial alignment according to my invention, but for purposes of simplicity I have illustrated a laminate construction employing only two such pipes.

As illustrated in FIG. 1, a pair of metal pipes are placed in an interfitting substantially coaxial relationship, the pipe 10 being shown as disposed within the outer pipe 12. The two pipes disposed in this coaxial relationship are forced between a series of pairs of rotating compression rolls. The pairs of rolls are identical in their construction except for the clearances provided between their mating faces. Each pair of rolls comprises two rolls having cooperating annular substantially semicircular grooves 16 interposed between annularly extending shoulders 18 along the rims of the rolls. Thus, the cooperating grooves 16 and shoulders 18 on each pair of rolls form a circular opening engageable with the entire circumference of the outer pipe 12 for compressing said pipe during passage between the rolls. Any number of sets of rolls may be employed. However, for purposes of illustration, the apparatus shown in the drawing employs only four sets of rolls 20, 22, 24, and 26.

The radius of the depth of the groove 16 in each of the rolls is slightly smaller than the lateral radii, such as 1.012 inches to 1.019 inches. Thus, while the rolls exert a compressive force against substantially the entire circumference of the outer pipe 12, the maximum compressive force exerted by the rolls is in the area disposed within the arcs A as shown in FIG. 2. In order that this maximum compressive force will be uniformly applied to the entire circumference of the outer pipe 12, adjacent pairs of rolls are disposed normal to each other. Alternatively, the axes of the rolls may be disposed in parallel planes and the pipes may be passed between the rolls several times, rotating the pipes between each pass.

The pairs of rolls are further arranged to exert a step-wise progressively increasing compressive force against the pipes as they are passed between the rolls. To this end, the minimum diameter of the opening formed by the grooves 16 in the rolls 22 is slightly smaller than the opening formed by the grooves 16 in the rolls 20, and the opening formed by the grooves 16 in the rolls 24 has a slightly smaller minimum diameter than the opening formed by the grooves 16 in the rolls 22, and so on until the opening formed by the groove in the last pair of rolls has a minimum diameter substantially equal to the outer diameter desired in the finished laminated pipe structure.

In producing a two-pipe laminate according to my invention, the diameters of the openings formed by the grooves in the several pairs of rolls decrease successively in size to a point such that after having passed between the last set of rolls the outer pipe will have been compressed beyond its limits of elasticity. During such compression the outer pipe is forced against the inner pipe to compress said inner pipe, but not to a degree such that said inner pipe loses its inherent elasticity. In this manner, the adjacent walls of the two pipes are firmly compressed against each other over substantially the entire extent of their abutting faces. This compressive force of the rolls is sufficient to form a rigid interfitting connection between the abutting faces of the two pipes, but is not of such a magnitude so as to form cold welded joints between the adjacent pipe walls.

The following example illustrates a method of forming a two-pipe laminate according to my invention. An 18 gauge inner pipe 10 having an outside diameter of 1.928 inches is disposed within a 20 gauge outer pipe 12 having a 2 1/16 inch outside diameter. The two pipes disposed in coaxial alignment are then passed between a series of compression rolls whose mating grooves form openings of decreasing diameter. In this example, the opening formed by the grooves 16 in the rolls 20 has a minimum diameter of 2.023 inches; the opening formed by the rolls 22 has a minimum diameter of 2.020 inches; the opening formed by the rolls 24 has a minimum diameter of 1.999 inches; and the opening formed by the rolls 26 has a minimum diameter of 1.998 inches. As the two pipes are passed successively through the several pairs of rolls, they are compressed until the inner pipe 12 reaches a minimum outer diameter of about 1.918 inches and the outer pipe 12 reaches a minimum outer diameter of about 2.000 inches. The outer pipe 12 is thus compressed beyond its limits of elasticity and will sustain its finished outer diameter of about 2.000 inches, but the inner pipe 10 has not been compressed beyond its limits of elasticity and will bindingly engage the inner face of the outer pipe 12.

This same sequence of operations is followed in forming a laminate comprised of any number of coaxially aligned pipes. In any such laminating procedure, the diameter of the opening between the last pair of rolls is such that it will compress all of the pipes, except for the innermost pipe, beyond their limits of elasticity, the innermost pipe not being so compressed beyond its limits of elasticity. Such multiple ply laminates may also be produced by first building up a two-pipe laminate in the manner previously described and then adding successive laminae, compressing each of said additional laminae beyond its limits of elasticity.

The term "rigid" as used herein with reference to the interconnection between the faces of adjacent pipe elements is used to denote that the adjacent faces of adjacent pipes are in contact with each other in a manner such that the pipes are held in fixed relationship to each other, and does not bear the connotation that the adjacent faces of adjacent pipes are in intimate contact such as would be effected by cold welding, hot welding, bolting together, or the like.

I claim as my invention:

1. A method of making laminated metal pipe for transferring and reducing the noise level of the exhaust gases from an automobile engine, comprising the steps of placing a pair of metal pipes one inside the other in substantially coaxial alignment, and rolling said pipes between a series of compression rolls to compress the outer pipe against the inner pipe to reduce the diameters of the pipes sufficiently to cause the inner pipe to exert an expansive force over its entire circumference against the outer pipe and dispose the adjacent faces of said pipes over their entire circumference in tight bearing relationship without effecting a cold weld between said adjacent faces.

2. A method of making laminated pipe as set forth in claim 1 with the addition that during said rolling step the inner pipe is compressed within its limits of elasticity and the outer pipe is compressed beyond its limits of elasticity.

3. A method making laminated pipe as set forth in claim 1 with the addition that during said rolling step the inner pipe is compressed within its limits of elasticity and the outer pipe is compressed to a greater degree.

4. A method of making laminated metal pipe for transferring and reducing the noise level of the exhaust gases from an automobile engine, comprising the steps of placing a plurality of pipes one within the other in substantially coaxial alignment, and rolling said assembled pipes between successive pairs of directly opposed compression rolls and thereby successively compressing complementary pairs of diametrically opposed arcuate segments of said pipes, each segment being less than 180°, and thereby compressing the entire circumference of the assembled pipes to reduce the diameter of each of said pipes sufficiently to cause each inner pipe to exert an expansive force over its entire circumference against the next outer pipe and dispose the adjacent faces of said pipes in tight bearing relationship without effecting a cold weld between said adjacent faces.

References Cited in the file of this patent

UNITED STATES PATENTS

| 117,494 | Elbridge | July 25, 1871 |
| 570,256 | Lavens | Oct. 27, 1896 |
| 914,332 | Briede | Mar. 2, 1909 |
| 2,132,555 | Baxter | Oct. 11, 1938 |
| 2,337,247 | Kepler | Dec. 21, 1943 |
| 2,586,653 | Hill | Feb. 19, 1952 |

FOREIGN PATENTS

| 11,311 | Great Britain | May 6, 1897 |